(12) United States Patent
Liu et al.

(10) Patent No.: US 11,315,605 B2
(45) Date of Patent: Apr. 26, 2022

(54) METHOD, DEVICE, AND COMPUTER PROGRAM PRODUCT FOR STORING AND PROVIDING VIDEO

(71) Applicant: EMC IP Holding Company LLC, Hopkinton, MA (US)

(72) Inventors: Qin Liu, Chengdu (CN); Jie Liu, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/917,801

(22) Filed: Jun. 30, 2020

(65) Prior Publication Data

US 2021/0375326 A1    Dec. 2, 2021

(30) Foreign Application Priority Data

May 28, 2020    (CN) .......................... 202010470802.4

(51) Int. Cl.
*G11B 27/19*     (2006.01)
*H04N 5/92*      (2006.01)
*H04N 21/432*    (2011.01)
*H04N 9/80*      (2006.01)
*H04N 5/917*     (2006.01)

(52) U.S. Cl.
CPC ............... *G11B 27/19* (2013.01); *H04N 5/92* (2013.01); *H04N 21/4325* (2013.01)

(58) Field of Classification Search
USPC ........ 386/241, 329, 330, 331, 334, 326, 239
See application file for complete search history.

(56) References Cited

U.S. PATENT DOCUMENTS

| | | | | |
|---|---|---|---|---|
| 7,359,620 | B2 * | 4/2008 | Morinaga | H04N 21/4334 386/239 |
| 2009/0106288 | A1 * | 4/2009 | Yang | H04N 21/6377 |
| 2009/0180761 | A1 * | 7/2009 | Wand | H04N 19/172 386/329 |
| 2010/0223648 | A1 * | 9/2010 | Tian | H04N 21/6587 725/88 |
| 2015/0269967 | A1 * | 9/2015 | Dandu | H04N 19/48 386/278 |
| 2017/0155697 | A1 * | 6/2017 | Cang | H04L 65/4092 |

* cited by examiner

*Primary Examiner* — Daquan Zhao
(74) *Attorney, Agent, or Firm* — Chamberlain, Hrdlicka, White, Williams & Aughtry

(57) ABSTRACT

Embodiments of the present disclosure relate to a method, a device, and a computer program product for storing and providing a video. A method for storing a video is provided, including: acquiring frame storage information in a to-be-stored video, the frame storage information including information related to storage of a plurality of frames in the video; converting the video into a plurality of data blocks based on the frame storage information; and converting the frame storage information into a streaming media index file to characterize the video in association with the plurality of data blocks. Embodiments of the present disclosure further provide a method for providing a video.

18 Claims, 6 Drawing Sheets

METHOD, DEVICE, AND COMPUTER PROGRAM PRODUCT FOR STORING AND PROVIDING VIDEO

CROSS-REFERENCE TO RELATED APPLICATION

This application claims priority to Chinese Patent Application No. 202010470802.4 filed on May 28, 2020. Chinese Patent Application No. 202010470802.4 is hereby incorporated by reference in its entirety.

TECHNICAL FIELD

Embodiments of the present disclosure generally relate to the field of information processing, and specifically to a method, a device, and a computer program product for storing and providing a video.

BACKGROUND

With the development of network technologies and video technologies, people increasingly watch, download, create, edit, and online share video content. At the same time, people have increasing demands for storing videos. Current storage systems or backup systems usually convert a to-be-stored file into data blocks, and then store them locally or transmit them to other storage devices for remote storage in order to save the storage space and/or improve the storage efficiency.

However, such an approach does not bring expected benefits for video storage. This is because videos have a unique data organization structure, and conventional storage approaches will negatively impact this structure. Therefore, at present, video storage has high requirements for storage space and has low storage efficiency. In addition, if a user expects to watch a part of a video, the user can only restore the whole video from a device storing the video.

SUMMARY OF THE INVENTION

Embodiments of the present disclosure provide a method, a device, and a computer program product for storing and providing a video.

In a first aspect of the present disclosure, a method for storing a video is provided. The method includes: acquiring frame storage information in a to-be-stored video, the frame storage information including information related to storage of a plurality of frames in the video; converting the video into a plurality of data blocks based on the frame storage information; and converting the frame storage information into a streaming media index file to characterize the video in association with the plurality of data blocks.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to execute actions. The actions include: acquiring frame storage information in a to-be-stored video, the frame storage information including information related to storage of a plurality of frames in the video; converting the video into a plurality of data blocks based on the frame storage information; and converting the frame storage information into a streaming media index file to characterize the video in association with the plurality of data blocks.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method according to the first aspect of the present disclosure.

In a fourth aspect of the present disclosure, a method for providing a video is provided. The method includes: acquiring, based on a determination that a request for acquiring at least a part of a video is received, a streaming media index file of the video, the video being characterized at least by the streaming media index file in association with a plurality of data blocks; determining, based on the streaming media index file, a group of data blocks corresponding to the at least a part of the video from the plurality of data blocks; and providing the group of data blocks in the form of streaming media service data.

In a fifth aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to execute actions. The actions include: acquiring, based on a determination that a request for acquiring at least a part of a video is received, a streaming media index file of the video, the video being characterized at least by the streaming media index file in association with a plurality of data blocks; determining, based on the streaming media index file, a group of data blocks corresponding to the at least a part of the video from the plurality of data blocks; and providing the group of data blocks in the form of streaming media service data.

In a sixth aspect of the present disclosure, a computer program product is provided. The computer program product is tangibly stored in a non-transitory computer storage medium and includes machine-executable instructions. The machine-executable instructions, when executed by a device, cause the device to execute any step of the method according to the fourth aspect of the present disclosure.

The Summary part is provided to introduce the selection of concepts in a simplified form, which will be further described in the Detailed Description below. The Summary part is neither intended to identify important features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, the same or corresponding numerals represent the same or corresponding parts.

DETAILED DESCRIPTION

Figure 1:
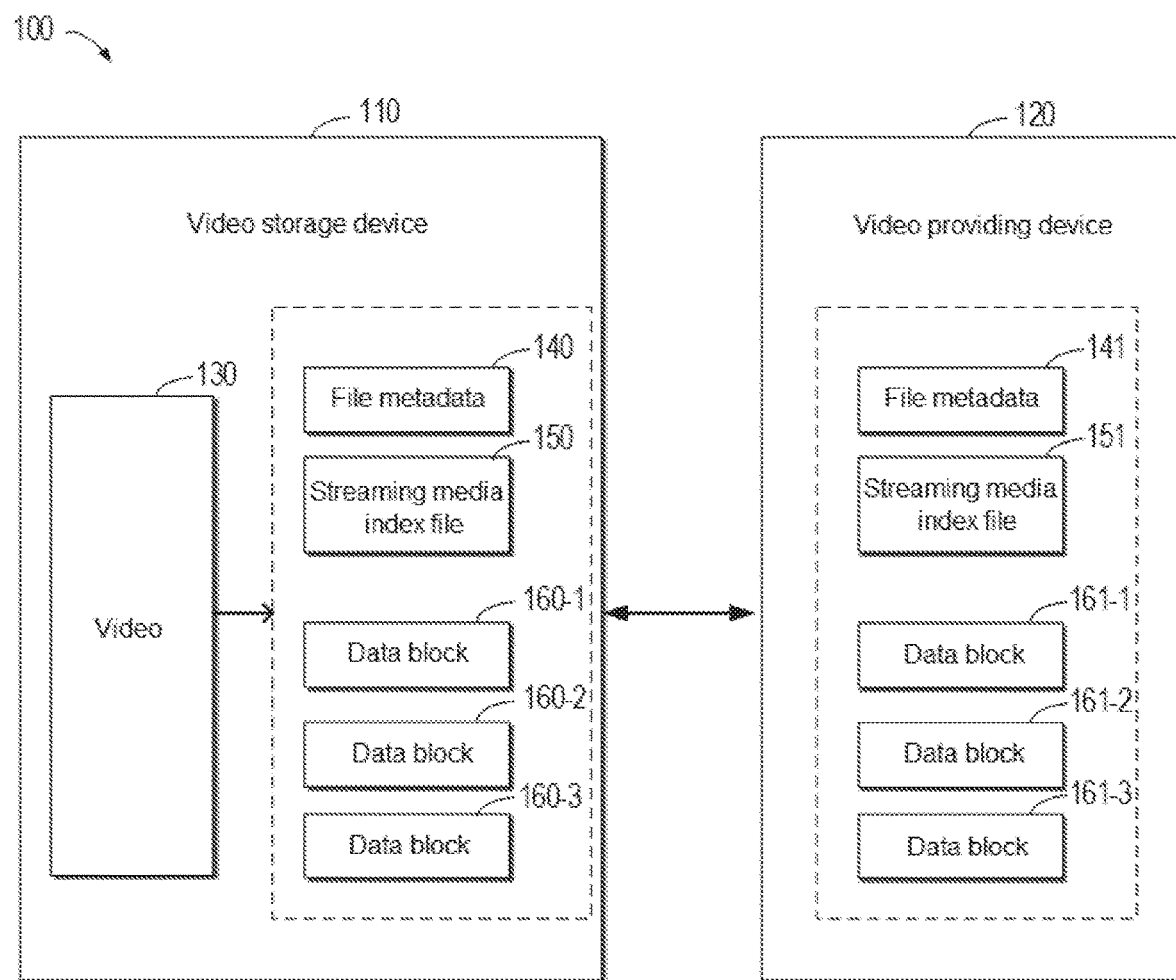
FIG. 1 shows a block diagram of an example video system in which embodiments of the present disclosure can be implemented.

Embodiments of the present disclosure will be described in more detail below with reference to the accompanying drawings. Although embodiments of the present disclosure are shown in the accompanying drawings, it should be appreciated that the present disclosure can be implemented in various forms and should not be limited by the embodiments set forth herein. Rather, these embodiments are provided to make the present disclosure more thorough and complete, and to fully convey the scope of the present disclosure to those skilled in the art.

The term "include" and its variants as used herein indicate open inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, with the development of network technologies and video technologies, people increasingly watch, download, and online share video content. The following is video data generated worldwide in 2019: more than 4 million hours of video content were uploaded to video website YouTube; YouTube users watched YouTube videos for 5.97 billion hours every day; user streams of online movie provider Netflix transmitted 694,444 hours of videos; users of short video provider TikTok watched more than 1 billion videos, and the like. Besides, people also create and edit video content. 53% of Tiktok users not only watch the content, but also create videos and then upload them to the Internet. Accordingly, people have increasing demands for storing or backing up videos.

Current video storage systems or backup systems usually convert a to-be-stored file into some data blocks, and then locally store metadata or data blocks of the file or transmit the metadata or data blocks to other storage devices, e.g., a backup server, for remote storage. Hash values of metadata or data blocks can be computed for use as indexes of the metadata or the data blocks.

Such a storage mode has the following advantages. First, the storage space can be saved. After segmenting a file into data blocks, the data blocks can be deduplicated. Identical data blocks are only stored in one copy. Other files with the data block can cite the data block by indexing, instead of repeatedly storing the data block. Second, the storage efficiency can be improved. When new file data is to be stored, it is only necessary to check the existence of its hash on a storage device without transmitting actual data blocks to the storage device.

However, such an approach does not bring expected benefits for video storage. This is because videos have a unique data organization structure, and conventional data block segmentation approaches will destroy the structure. Therefore, even for video frames with the same code, segmented blocks will be different for different container formats. This will result in a very low video deduplication rate. However, videos are often large. Therefore, video storage has high requirements for storage space and has low storage efficiency.

In addition, if a part of a video that has been stored in a storage device is to be read, it is necessary to first restore the whole video from data blocks where it is stored and then read the part of the video, which results in a low video providing efficiency and wastes resources. In addition, users cannot know whether content of the video being watched is unique, in other words, whether the content is cited by other videos in the storage device.

Embodiments of the present disclosure provide a solution for storing and providing a video, so as to solve the above problems and one or more of other potential problems. The solution converts a video into a plurality of data blocks based on frame storage information, and converts the frame storage information into a streaming media index file to characterize the video in association with the plurality of data blocks, thereby not only saving the video storage space and improving the video storage efficiency, but also enabling users to read at least a part of the video without restoring the whole video.

FIG. 1 shows a block diagram of example video system 100 in which embodiments of the present disclosure can be implemented. As shown in FIG. 1, video system 100 includes video storage device 110 and video providing device 120.

Video storage device 110 is a device capable of processing and storing video 130. Video 130 may be a video of various types, for example, a video of an MP4 type, a video of an AVI type, or the like. As described in detail below, video storage device 110 can convert the video into a plurality of data blocks 160-1 to 160-3 (collectively referred to as data block 160) while retaining an original data structure of video 130. The data structure of video 130 will be described in detail below with reference to FIG. 4. Video storage device 110 can also generate streaming media index file 150 to characterize video 130 together with data block 160. Video storage device 110 may be, e.g., a computer, a virtual machine, or a server. The present disclosure is not limited in this regard.

Video providing device 120 is a device capable of receiving a request for acquiring a video and providing video content based on the request. Video providing device 120 stores file metadata 141 of the video transmitted from video storage device 110, streaming media index file 151, data block 161, and the like. Video providing device 120 may be, e.g., a computer, a virtual machine, or a server. The present disclosure is not limited in this regard. Video storage device 110 and video providing device 120 can communicate with each other via a network. The network may be, e.g., the Internet or an intranet.

It should be understood that the structure of video system 100 is described for illustrative purposes only, and does not imply any limitation to the scope of the present disclosure. For example, the embodiments of the present disclosure may also be applied to a system different from video system 100. It should be understood that the specific number of the above devices is given for illustrative purposes only, and does not imply any limitation to the scope of the present disclosure. For example, the embodiments of the present disclosure may also be applied to more video providing devices 120. Alternatively, the embodiments of the present disclosure may also integrate video storage device 110 and video providing device 120 into the same device.

Figure 2:
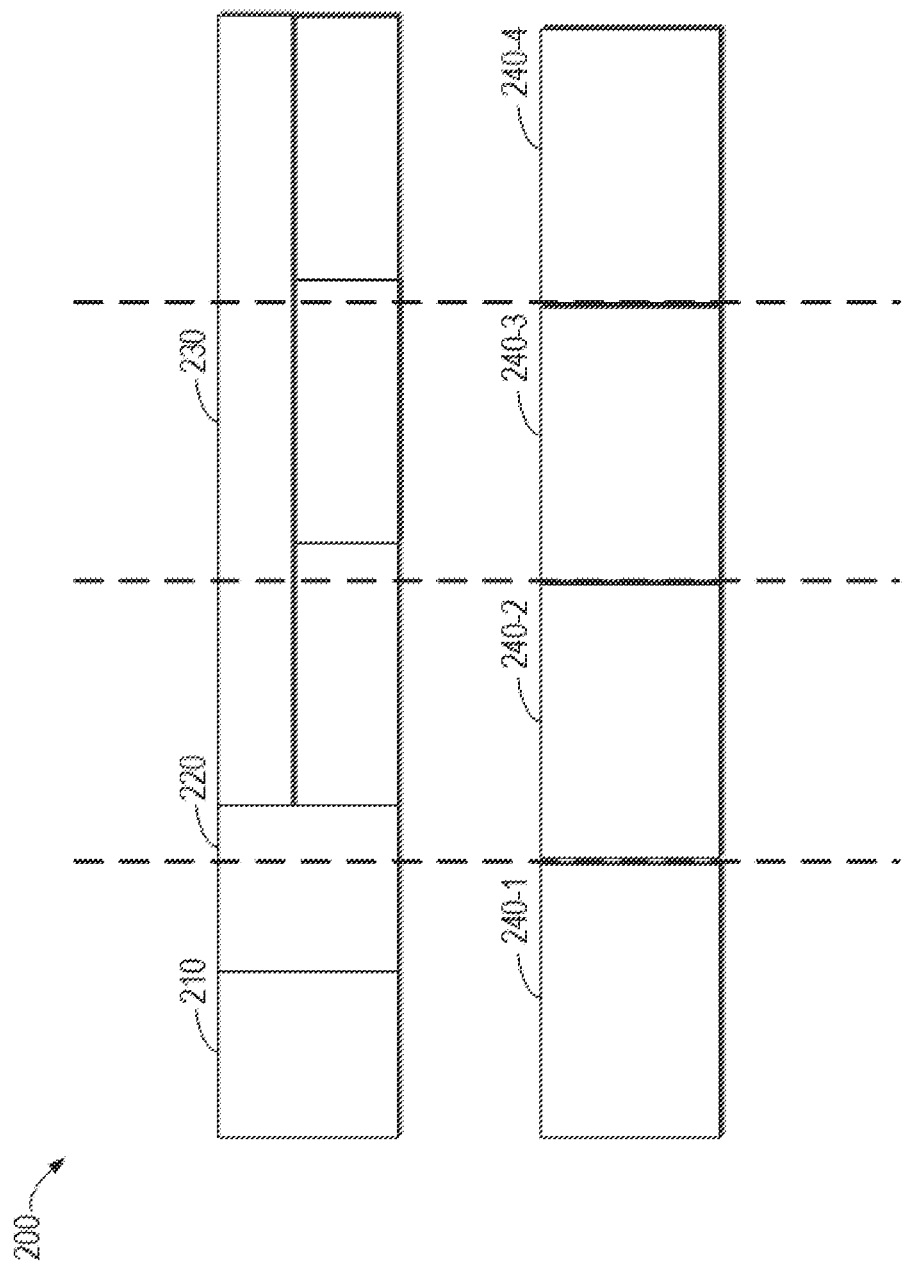
FIG. 2 shows a schematic diagram of a result after using a conventional video storage method.

FIG. 2 shows a schematic diagram of result 200 after using a conventional video storage method. As shown in FIG. 2, an example video has video information packets 210 and 220 and video data packet 230. Video data packet 230 has a plurality of frames. After using a conventional video storage method, data blocks 240-1 to 240-4 (collectively referred to as data block 240) are obtained. As shown in FIG. 2, data block 240 no longer retains an original packet structure of the video. Therefore, even for video frames with the same code, data blocks corresponding to the video frames are also different due to different container formats, thus resulting in a low video deduplication rate.

Figure 3:
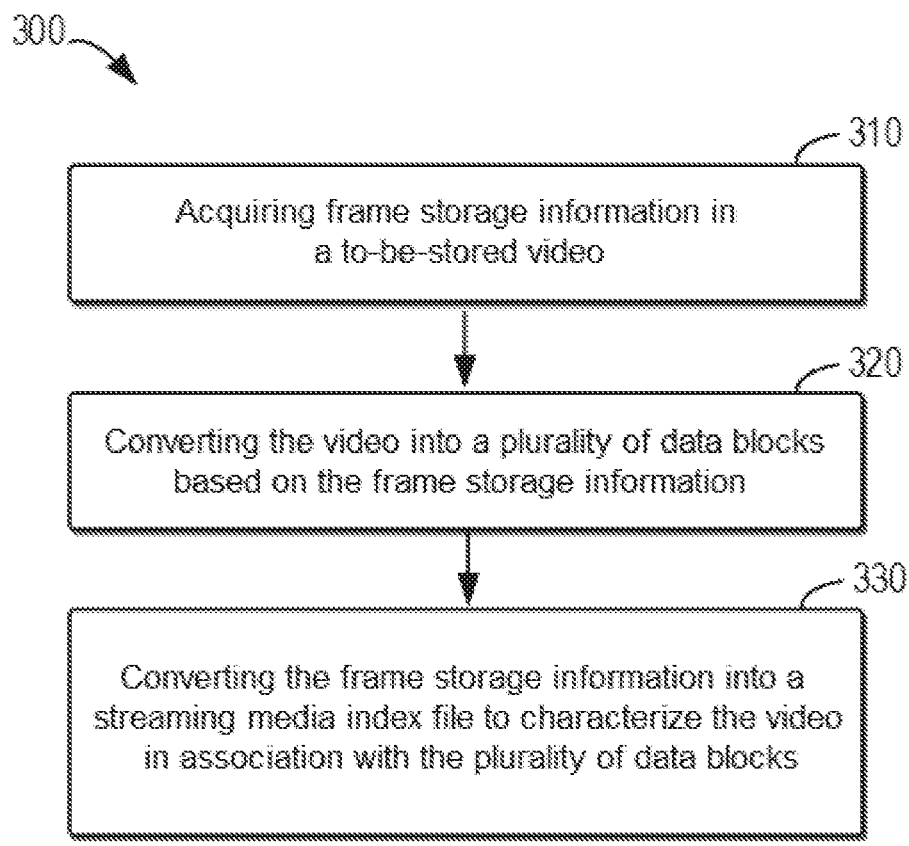
FIG. 3 shows a flowchart of an example method for storing a video according to an embodiment of the present disclosure.

FIG. 3 shows a flowchart of example method 300 for storing a video according to an embodiment of the present disclosure. For example, method 300 may be executed by video storage device 110 as shown in FIG. 1. It should be understood that method 300 may also be executed by other devices. The scope of the present disclosure is not limited in this regard. It should be further understood that method 300 may further include additional actions that are not shown and/or may omit actions that are shown. The scope of the present disclosure is not limited in this regard.

In 310, video storage device 110 can acquire frame storage information in a to-be-stored video, the frame storage information including information related to storage of a plurality of frames in the video.

In some embodiments, the video may be a video of various types, for example, a video of an MP4 type, a video of an AVI type, or the like. The frame storage information may include information related to storage of the plurality of frames in the video. For example, in some embodiments, the frame storage information may include offsets of the plurality of frames in the video. An offset of each frame indicates a distance from a starting storage location of the frame to a starting storage location of the video. Additionally, in some other embodiments, the frame storage information may include a container type of the video. Based on the container type of the video, video storage device 110 can determine a coding approach of the frames for subsequent conversion of the frames of the video into data blocks. Additionally, in some other embodiments, the frame storage information may include the number of the plurality of frames in the video and types of the plurality of frames, e.g., a video frame, an audio frame, etc.

Figure 4A:
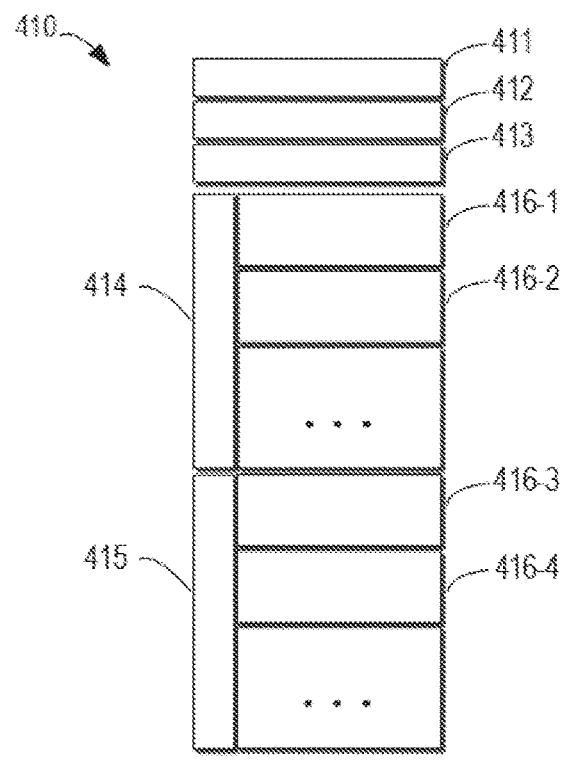
FIG. 4A shows a schematic diagram of a data structure of a video of a type according to an embodiment of the present disclosure.

For ease of description, FIG. 3 is described below with reference to FIG. 4A and FIG. 4B. FIG. 4A shows schematic diagram 410 of a data structure of a video of a type according to an embodiment of the present disclosure. As shown in FIG. 4A, a video of a type, e.g., a video of an MP4 type, may include file metadata 411, ftyp packet 412, moov packet 413, video data packet 414, and audio data packet 415. File metadata 411 can store information such as a storage type of the video in an operating system, a size of a video file, and video creation time. Ftyp packet 412 can store information such as a container type, version, and compatibility protocol of the video. Moov packet 413 can store information such as offsets of a plurality of frames in the video, the number of the plurality of frames, and types of the plurality of frames. Video data packet 414 and audio data packet 415 include a plurality of frames 416-1, 416-2, 416-3, 416-4, etc. (collectively referred to as frame 416).

In such an embodiment, frame storage information may include ftyp packet 412 and moov packet 413. Video storage device 110 can acquire the offsets of the plurality of frames 416 in the video by reading moov packet 413. An offset of each frame indicates a distance from a starting storage location of the frame to a starting storage location of the video. Video storage device 110 can also acquire the container type of the video by reading ftyp packet 412. In the embodiment, the container type is MP4.

Figure 4B:
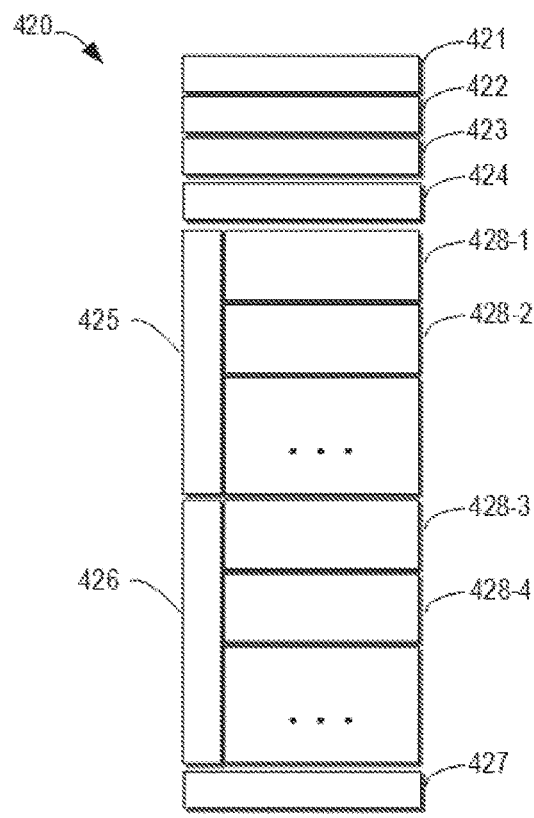
FIG. 4B shows a schematic diagram of a data structure of a video of another type according to an embodiment of the present disclosure.

FIG. 4B shows schematic diagram 420 of a data structure of a video of another type according to an embodiment of the present disclosure. As shown in FIG. 4B, a video of another type, e.g., a video of an AVI type, may include file metadata 421, container type information 422, header file list 423, information list 424, video list 425, audio list 426, and index block 427. Similarly, file metadata 421 can store information such as a storage type of the video in an operating system, a size of a video file, and video creation time. Frame storage information may include container type information 422, header file list 423, information list 424, and index block 427. Video list 425 and audio list 426 include a plurality of frames 428-1, 428-2, 428-3, 428-4, etc. (collectively referred to as frame 428).

In such an embodiment, similar to FIG. 4A, video storage device 110 can acquire offsets of the plurality of frames 428 in the video and a container type of the video by reading the frame storage information. In this embodiment, the container type is AVI.

FIG. 4A and FIG. 4B show data structures of videos of two different types. It should be understood that some data structures of videos are shown for illustrative purposes only, and do not imply any limitation to the scope of the present disclosure. For example, the embodiments of the present disclosure are also applicable to videos of other types.

Now returning to FIG. 3, in 320, video storage device 110 can convert the video into a plurality of data blocks based on the frame storage information.

In some embodiments, video storage device 110 can determine a starting storage location and an ending storage location of each of the plurality of frames in the video based on the frame storage information, and then store one or more of the plurality of frames as a data block based on the starting storage location and the ending storage location.

For example, in some embodiments, video storage device 110 can determine a starting storage location and an ending storage location of each frame based on an offset and a size of each frame acquired by reading the frame storage information, and then store each frame as a data block. Alternatively, in some other embodiments, video storage device 110 can store multiple frames as a data block. Additionally, in some embodiments, video storage device 110 can store the frame storage information as a data block. For example, in the embodiment as shown in FIG. 4A, video storage device 110 can store ftyp packet 412 and moov packet 413 as a data block. In the embodiment as shown in FIG. 4B, video storage device 110 can store container type information 422, header file list 423, information list 424, and index block 427 as a data block.

By this approach, when a video is converted into a plurality of data blocks, an original data structure of the video is retained, instead of being destroyed as shown in FIG. 2. Since each frame is completely stored in the data blocks, when the plurality of data blocks are deduplicated, the same frame can be effectively deduplicated, thereby improving the video deduplication rate. This contributes to saving the video storage space and improving the video storage efficiency.

In 330, video storage device 110 can convert the frame storage information into a streaming media index file to characterize the video in association with the plurality of data blocks.

In some embodiments, video storage device 110 can convert the frame storage information into an m3u8 index file. The m3u8 index file complies with the streaming media protocol HTTP Live Streaming (HLS). Alternatively, in other embodiments, video storage device 110 can convert the frame storage information into a streaming media index file complying with a streaming media protocol such as HTTP Dynamic Streaming (HDS), Real-Time Messaging Protocol (RTMP), and Microsoft Smooth Streaming (MSS). Additionally, in some embodiments, video storage device 110 can store the streaming media index file and file metadata together.

In some embodiments, video storage device 110 can transmit the streaming media index file and the plurality of data blocks to a device external to video storage device 110, e.g., to video providing device 120, for storage. Alternatively or additionally, video storage device 110 may also locally store the streaming media index file and the plurality of data blocks. Due to the existence of the streaming media index file, a user can send a request for acquiring at least a part of the video to video storage device 110 or video providing device 120 where the video is located based on a streaming media protocol. Then, the at least a part of the video can be determined and provided to the user in the form of streaming media service data, making it possible to read at least a part of the video without restoring the whole video. This aspect will be described in detail below with reference to FIG. 5.

The above example embodiments convert a video into a plurality of data blocks based on frame storage information, and convert the frame storage information into a streaming media index file to characterize the video in association with the plurality of data blocks, thereby not only saving the video storage space and improving the video storage efficiency, but also making it possible to read at least a part of the video without restoring the whole video.

Figure 5:
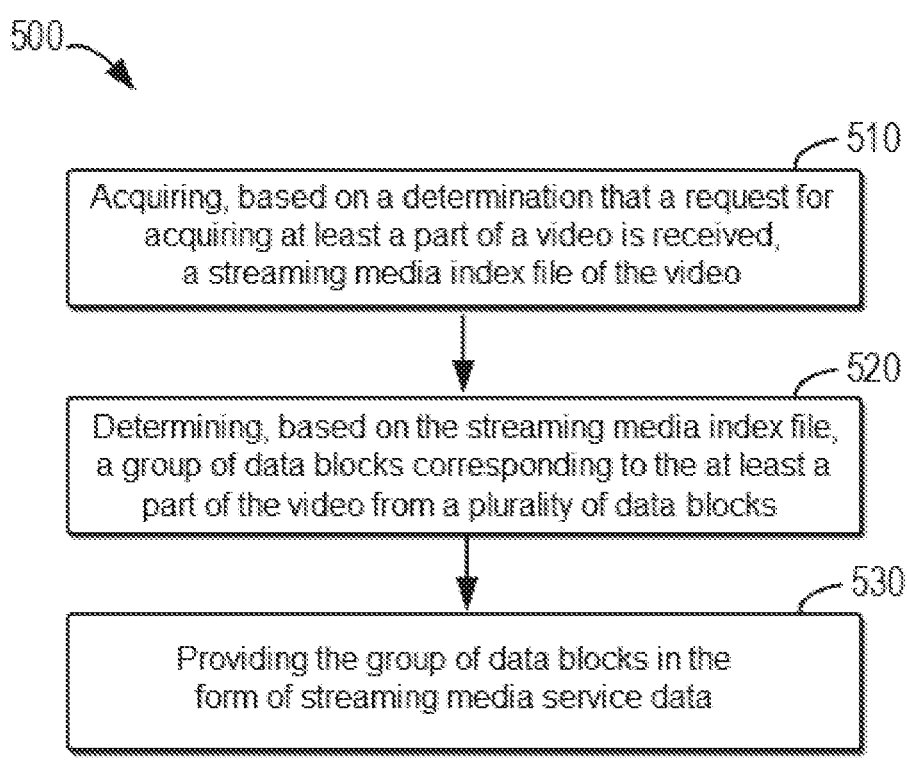
FIG. 5 shows a flowchart of an example method for providing a video according to an embodiment of the present disclosure.

FIG. 5 shows a flowchart of example method 500 for providing a video according to an embodiment of the present disclosure. For example, method 500 may be executed by video providing device 120 as shown in FIG. 1. It should be understood that method 500 may also be executed by other devices. The scope of the present disclosure is not limited in this regard. It should be further understood that method 500 may further include additional actions that are not shown and/or may omit actions that are shown. The scope of the present disclosure is not limited in this regard.

In 510, video providing device 120 can acquire, based on a determination that a request for acquiring at least a part of a video is received, a streaming media index file of the video, the video being characterized at least by the streaming media index file in association with a plurality of data blocks.

In some embodiments, a user who wants to acquire a video may send a request for acquiring at least a part of the video to video providing device 120. The request may include an ID of the to-be-acquired video. After receiving the request with the video ID, video providing device 120 acquires a streaming media file of the video based on the video ID.

In 520, video providing device 120 can determine, based on the streaming media index file, a group of data blocks corresponding to the at least a part of the video from the plurality of data blocks.

In some embodiments, video providing device 120 can analyze frame indexes corresponding to the requested at least a part into offsets of data blocks based on the acquired streaming media index file, and then determine a group of data blocks based on the offsets.

In 530, video providing device 120 can provide the group of data blocks in the form of streaming media service data.

In some embodiments, video providing device 120 may convert the group of data blocks into a streaming data format, e.g., into MPEG-2 fragments, and then convert the streaming data format into streaming media service data for providing to a user or a user device.

Additionally, in some embodiments, in order to provide smoother video content, video providing device 120 can buffer, after receiving a plurality of requests, multiple groups of data blocks corresponding to the plurality of requests, and then provide the multiple groups of data blocks together to a user or a user device. For example, video providing device 120 may buffer five minutes of video content and then provide them together to the user or the user device.

Additionally, in some embodiments, video providing device 120 can add statistical information related to the video to the streaming media service data, the statistical information at least indicating whether the group of data blocks is cited by another video in a storage device where the video is located. In the embodiments shown herein, the storage device where the video is located may be video storage device 110 or video providing device 120.

For example, in some embodiments, video providing device 120 can generate the statistical information of the video while the video is transmitted to video providing device 120. The statistical information may indicate a frame deduplication rate of the video, citation of data blocks corresponding to a plurality of frames by other videos on video providing device 120, and the like. Additionally, in some embodiments, video providing device 120 may add the statistical information based on SCTE-35 specification into a media playlist file using an EXT-X-DATERANGE tag. There may be a series of media fragments (URIs) between two EXT-X-DATERANGE tags containing SCTE35-OUT and SCTE35-IN attributes, respectively. These media segments generally represent advertising programs that can be replaced by local or customized advertisements. Video providing device 120 can generate such statistical information as a small video, and then add it into a server tmp file. When the provided video part is being played, the playlist will jump to the generated small video to play the statistical information.

As an example, if the content from moment 1:00 to moment 2:00 among five minutes of video content is a unique frame that is not cited by other videos in video providing device 120, video providing device 120 can generate a five second small video containing statistical information to inform the user of "The following content from moment 1:00 to moment 2:00 is a unique part in the storage device." When the user watches the video until second 00:55, the generated five second small video will be played to inform the user that the next part from 1:00 to 2:00 is unique. The user may restore the video based on the statistical information. Additionally or alternatively, if the provided content is not unique, video providing device 120 can list a title of a video citing data blocks corresponding to the provided content. It should be understood that the above example embodiments are shown for illustrative purposes only and do not imply any limitation to the scope of the present disclosure. For example, the statistical information may further indicate other information, and the statistical information may also be added in other forms.

In the above example embodiments, by providing data blocks of a video using a streaming media index file, at least a part of the video can be read without restoring the whole video. In addition, by adding statistical information related to the video, whether the provided video content is unique on a storage device where the video is located can be indicated.

Figure 6:
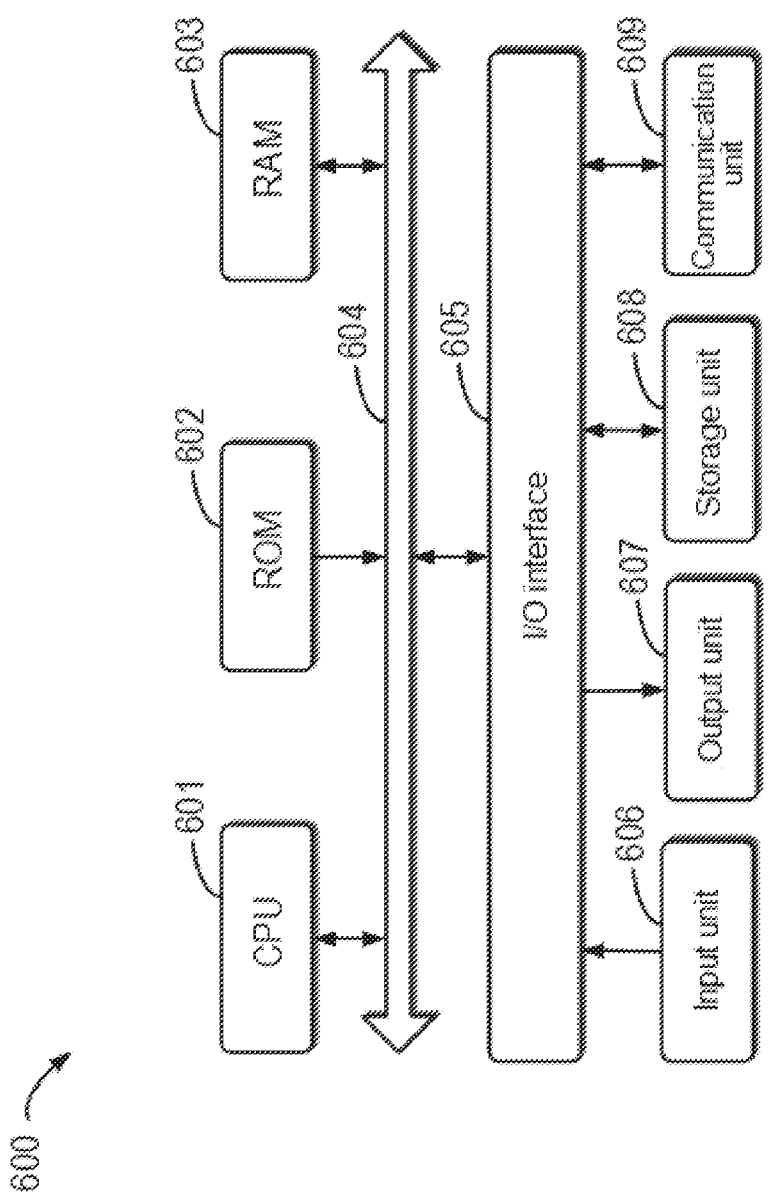
FIG. 6 shows a schematic block diagram of an example electronic device that may be configured to implement the embodiments of the present disclosure.

FIG. 6 shows a schematic block diagram of example electronic device 600 that may be configured to implement the embodiments of the present disclosure. For example, video providing device 110 and/or the video providing device as shown in FIG. 1 may be implemented by electronic device 600. As shown in FIG. 6, electronic device 600 includes central processing unit (CPU) 601, which may execute various appropriate actions and processing in accordance with computer program instructions stored in read-only memory (ROM) 602 or computer program instructions loaded from storage unit 608 onto random access memory (RAM) 603. RAM 603 may further store various programs and data required for operations of electronic device 600. CPU 601, ROM 602, and RAM 603 are connected to each other through bus 604. Input/output (I/O) interface 605 is also connected to bus 604.

A plurality of components in electronic device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows electronic device 600 to exchange information/data with other devices via a computer network such as the Internet and/or various telecommunication networks.

The processes and processing described above, such as methods 300 and 500, may be executed by processing apparatus 601. For example, in some embodiments, methods 300 and 500 may be embodied as a computer software program that is tangibly included in a machine-readable medium, such as storage unit 608. In some embodiments, some or all of the computer program can be loaded into and/or installed onto electronic device 600 via ROM 602 and/or communication unit 609. When the computer program is loaded into RAM 603 and executed by CPU 601, one or more actions of methods 300 and 500 described above may be executed.

The present disclosure may be a method, an apparatus, a system, and/or a computer program product. The computer program product may include a computer-readable storage medium with computer-readable program instructions for executing various aspects of the present disclosure loaded thereon.

The computer-readable storage medium may be a tangible device that can retain and store instructions for use by an instruction-executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals themselves, such as radio waves or other freely propagating electromagnetic waves, electromagnetic waves propagating through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions can be executed entirely on a user computer, executed partly on a user computer, executed as a separate software package, executed partly on a user computer and partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described here with reference to the flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented by using computer-readable program instructions.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, another programmable data processing apparatus, or another device such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may occur in a sequence different from that shown in the figures. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms used herein is intended to best explain the principles and practical applications of the embodiments or the technological improvements to technologies on the market, or to enable other persons of ordinary skill in the art to understand the embodiments disclosed herein.

The invention claimed is:

1. A method for storing a complete version of a video, comprising:
acquiring frame storage information of the complete version of the video, wherein the frame storage information comprises information related to storage of a plurality of frames in the video and the video comprises an original data structure based on a container type of the video, and wherein the original data structure delimits data making up an entirety of the complete version of the video;
converting the entirety of the complete version of the video into only a single data structure comprising a plurality of data blocks based on the frame storage information without changing any portion of the original data structure of the complete version of the video,
wherein a structure of an entirety of the single data structure is identical to that of the original data structure of the complete version of the video and the entirety of the single data structure contains the entirety of the complete version of the video,
wherein the frame storage information is converted into a first data block among the plurality of data blocks,
wherein the plurality of frames in the video are converted into second data blocks of the plurality of data blocks using the frame storage information in the first data block, and
wherein, within the single data structure:
the frame storage information is included only in the first data block, and
the second data blocks include only video or audio data of the video; and
generating, using the frame storage information, a streaming media index file that is distinct and separate from the single data structure to characterize the entirety of the video in association with the plurality of data blocks of the single data structure.

2. The method according to claim 1, wherein acquiring the frame storage information of the video comprises: acquiring offsets of the plurality of frames in the video, an offset of each frame indicating a distance from a starting storage location of the frame to a starting storage location of the video.

3. The method according to claim 2, wherein acquiring the frame storage information of the video further comprises acquiring at least one of following items: the container type of the video, the number of the plurality of frames, and types of the plurality of frames.

4. The method according to claim 1, wherein converting the video into the plurality of data blocks comprises:
determining, based on the frame storage information, a starting storage location and an ending storage location of each of the plurality of frames in the video; and
dividing, based on the starting storage location and the ending storage location, the plurality of frames into the second data blocks of the plurality of data blocks.

5. The method according to claim 1, further comprising:
acquiring, based on a determination that a request for acquiring at least a part of the video is received, the streaming media index file of the video;
determining, based on the streaming media index file, a group of data blocks corresponding to the at least a part of the video from the plurality of data blocks; and
providing the group of data blocks as streaming media service data.

6. The method according to claim 5, further comprising:
adding statistical information related to the video to the streaming media service data, the statistical information at least indicating whether the group of data blocks is cited by a video other than the video.

7. An electronic device, comprising:
at least one processing unit; and at least one memory, the at least one memory being coupled to the at least one processing unit and storing instructions for execution by the at least one processing unit,
wherein the instructions, when executed by the at least one processing unit, cause the electronic device to perform a method for storing a complete version of a video,
the method comprising:
acquiring frame storage information of the complete version of the video, wherein the frame storage information comprises information related to storage of a plurality of frames in the video and the video comprises an original data structure based on a container type of the video, and wherein the original data structure delimits content making up an entirety of the complete version of the video;
converting the entirety of the complete version of the video into only a single data structure comprising a plurality of data blocks based on the frame storage information without changing any portion of the original data structure of the complete version of the video,
wherein a structure of an entirety of the single data structure is identical to that of the original data structure of the complete version of the video and the entirety of the single data structure contains the entirety of the complete version of the video,
wherein the frame storage information is converted into a first data block among the plurality of data blocks,
wherein the plurality of frames in the video are converted into second data blocks of the plurality of data blocks using the frame storage information in the first data block, and
wherein, within the single data structure:
the frame storage information is included only in the first data block, and
the second data blocks include only video or audio data of the video; and
generating, using the frame storage information, a streaming media index file that is distinct and separate from the single data structure to characterize the entirety of the video in association with the plurality of data blocks of the single data structure.

8. The electronic device according to claim 7, wherein acquiring the frame storage information of the video comprises: acquiring offsets of the plurality of frames in the video, an offset of each frame indicating a distance from a starting storage location of the frame to a starting storage location of the video.

9. The electronic device according to claim 8, wherein acquiring the frame storage information of the video further comprises acquiring at least one of following items: the container type of the video, the number of the plurality of frames, and types of the plurality of frames.

10. The electronic device according to claim 7, wherein converting the video into the plurality of data blocks comprises:
determining, based on the frame storage information, a starting storage location and an ending storage location of each of the plurality of frames in the video; and
dividing, based on the starting storage location and the ending storage location, the plurality of frames into the second data blocks of the plurality of data blocks.

11. The electronic device according to claim 7, the method further comprising:

acquiring, based on a determination that a request for acquiring at least a part of the video is received, the streaming media index file of the video;
determining, based on the streaming media index file, a group of data blocks corresponding to the at least a part of the video from the plurality of data blocks; and
providing the group of data blocks as streaming media service data.

12. The electronic device according to claim 11, the further comprising:
adding statistical information related to the video to the streaming media service data, the statistical information at least indicating whether the group of data blocks is cited by a video other than the video.

13. A non-transitory computer storage medium storing a computer program product comprising machine-executable instructions, wherein the machine-executable instructions, when executed by a device, cause the device to execute a method for storing a complete version of a video, the method comprising:
acquiring frame storage information of the complete version of the video, wherein the frame storage information comprises information related to storage of a plurality of frames in the video and the video comprises an original data structure based on a container type of the video, and wherein the original data structure delimits data making up an entirety of the complete version of the video;
converting the entirety of the complete version of the video into only a single data structure comprising a plurality of data blocks based on the frame storage information without changing any portion of the original data structure of the complete version of the video,
wherein a structure of an entirety of the single data structure is identical to that of the original data structure of the complete version of the video and the entirety of the single data structure contains the entirety of the complete version of the video,
wherein the frame storage information is converted into a first data block among the plurality of data blocks,
wherein the plurality of frames in the video are converted into second data blocks of the plurality of data blocks using the frame storage information in the first data block, and
wherein, within the single data structure:
the frame storage information is included only in the first data block, and
the second data blocks include only video or audio data of the video; and
generating, using the frame storage information, a streaming media index file that is distinct and separate from the single data structure to characterize the entirety of the video in association with the plurality of data blocks of the single data structure.

14. The non-transitory computer storage medium according to claim 13, wherein acquiring the frame storage information of the video comprises: acquiring offsets of the plurality of frames in the video, an offset of each frame indicating a distance from a starting storage location of the frame to a starting storage location of the video.

15. The non-transitory computer storage medium according to claim 14, wherein acquiring the frame storage information of the video further comprises acquiring at least one of following items: the container type of the video, the number of the plurality of frames, and types of the plurality of frames.

16. The non-transitory computer storage medium according to claim 13, wherein converting the video into the plurality of data blocks comprises:
- determining, based on the frame storage information, a starting storage location and an ending storage location of each of the plurality of frames in the video; and
- dividing, based on the starting storage location and the ending storage location, the plurality of frames into the second data blocks of the plurality of data blocks.

17. The non-transitory computer storage medium according to claim 13, the method further comprising:
- acquiring, based on a determination that a request for acquiring at least a part of the video is received, the streaming media index file of the video;
- determining, based on the streaming media index file, a group of data blocks corresponding to the at least a part of the video from the plurality of data blocks; and
- providing the group of data blocks in as streaming media service data.

18. The non-transitory computer storage medium according to claim 17, the method further comprising:
- adding statistical information related to the video to the streaming media service data, the statistical information at least indicating whether the group of data blocks is cited by a video other than the video.

* * * * *